US006529238B1

(12) United States Patent
Mahant-Shetti et al.

(10) Patent No.: US 6,529,238 B1
(45) Date of Patent: Mar. 4, 2003

(54) METHOD AND APPARATUS FOR COMPENSATION OF POINT NOISE IN CMOS IMAGERS

(75) Inventors: Shivaling S. Mahant-Shetti, Garland, TX (US); David A. Martin, Atlantic Highlands, NJ (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/145,385

(22) Filed: Sep. 1, 1998

Related U.S. Application Data

(60) Provisional application No. 60/058,066, filed on Sep. 5, 1997.

(51) Int. Cl.$^7$ .................................................. H04N 9/64
(52) U.S. Cl. ....................................................... 348/246
(58) Field of Search .................................. 348/246, 241, 348/243, 247; 358/463

(56) References Cited

U.S. PATENT DOCUMENTS

| | | | | |
|---|---|---|---|---|
| 3,866,980 A | * | 2/1975 | Eisele et al. ............... 303/122.1 |
| 4,343,021 A | * | 8/1982 | Frame ......................... 358/213 |
| 4,541,116 A | * | 9/1985 | Lougheed .................... 382/260 |
| 4,667,303 A | * | 5/1987 | Pfennings .................... 708/702 |
| 4,739,495 A | * | 4/1988 | Levine ......................... 348/247 |
| 5,047,861 A | * | 9/1991 | Houchin et al. ............. 348/247 |
| 5,086,343 A | * | 2/1992 | Cook et al. .................. 348/247 |
| 5,327,131 A | * | 7/1994 | Ueno et al. ................... 327/50 |
| 5,327,246 A | * | 7/1994 | Suzuki ......................... 348/246 |
| 5,331,420 A | * | 7/1994 | Yamano et al. .............. 348/241 |
| 5,627,722 A | * | 5/1997 | Hirst ............................ 307/39 |
| 5,673,058 A | * | 9/1997 | Uragami et al. ............. 345/3.1 |
| 6,028,628 A | * | 2/2000 | Van Der Valk ............. 348/246 |
| 6,293,465 B1 | * | 9/2001 | Heller et al. ................. 235/439 |
| 6,307,393 B1 | * | 10/2001 | Shimura ...................... 324/765 |

* cited by examiner

*Primary Examiner*—Andrew Christensen
*Assistant Examiner*—Eric Wisdahl
(74) *Attorney, Agent, or Firm*—Robert D. Marshall, Jr.; W. James Brady, III; Frederick J. Telecky, Jr.

(57) ABSTRACT

This invention corrects of white spot noise in an imager. If the brightness value of a pixel is greater than the maximum brightness value of eight surrounding pixels, then the compensated output is this maximum brightness value. If the brightness value of the pixel is less than the maximum brightness value, then no compensation is applied. Alternatively the brightness value of the pixel may be compared with the maximum brightness value plus a threshold value. The invention stores correction values for a few pixels. If a particular pixel has a stored correction value, then this is subtracted from the brightness value of the particular pixel and the maximum brightness correction is applied to this difference. The stored correction value is replaced with the difference between the brightness value of the particular pixel and the maximum brightness value if this difference is greater than the stored correction value.

13 Claims, 2 Drawing Sheets

METHOD AND APPARATUS FOR COMPENSATION OF POINT NOISE IN CMOS IMAGERS

This application claims priority under 35 USC §119(e)(1) of Provisional Application No. 60/058,066, filed Sep. 5, 1997.

TECHNICAL FIELD OF THE INVENTION

The technical field of this invention is error correction techniques for semiconductor image sensors such as video cameras or electronic still cameras.

BACKGROUND OF THE INVENTION

There is increasing interest in CMOS (Complementary Metal Oxide Semiconductor) imagers. These imagers can be fabricated in standard CMOS processes such as used for semiconductor memory or logic circuits. These CMOS processes differ from the CCD (Charge Coupled Device) processes previously used to form imagers.

Constructing imagers from CMOS processes has several advantages over the prior use of CCD processes. Charge coupled devices are constructed using semiconductor processes that are incompatible with CMOS circuits. It is usually not cost effective to construct other integrated circuits in a facility designed for CCD fabrication. Thus the production capacity of facility must be matched to the demand for a narrow range of products, i.e. the CCD imager. An imager constructed of CMOS processes may be fabricated in the same facility that fabricates semiconductor memory and logic integrated circuits. Production from such a facility may be allocated to semiconductor memories, semiconductor logic circuits and CMOS imagers. This permits the capacity of the facility to be divided among plural types of integrated circuits enhancing the opportunity to achieve full utilization without excess overcapacity. Charge coupled device imagers commonly require a 12 volt power supply rather than the 5 volt or 3.3 volt power supplies typically used for CMOS integrated circuits. In a typical system including a CCD imager and other electronics, a separate 12 volt power supply must be provided to power the CCD. This voltage difference causes CCD imagers to typically consume more electric power than similarly sized CMOS integrated circuits. This makes CCD imagers less useful in portable, battery powered applications. In addition, higher typical power consumption of CCD's may require a more aggressive thermal management and a expensive package. Lastly, certain auxiliary circuits, such as analog to digital converters or memory, may be fabricated on the same integrated circuit as a CMOS imager. It is difficult to adapt the semiconductor manufacturing processes used to fabricate CCD's to provide similar on-chip circuits. The capability of integrating additional logic functions on the CMOS imager integrated circuit permits a lower integrated circuit package count for the end use system. This lower package count enables a lower assembly cost and a lower system cost. This lower package count may also lower the system power consumption, making such circuits valuable for portable systems.

There is a common problem with CMOS imagers that reduces their widespread use despite these advantages over CCD's. Due to variations in the semiconductor manufacturing process, CMOS imagers are subject to point defects from single image pixels. These point defects typically appear as spatially fixed isolated white spots and are called white spot noise. These point defects are due to variations in the dark current among the individual light sensitive elements. The mechanism creating this white spot noise will be explained in detail below. There are several methods typically employed to deal with white spot noise. The most commonly used method is to discard imagers having too much white spot noise. This technique lowers the effective yield and thus increases the cost of each good imager. A second method measures the white spot noise upon manufacture. This information is saved in a memory such as an Electrically Programmable Read Only Memory (EPROM). During use the stored white spot noise value for each pixel is subtracted from the current imager signal to produce a signal corrected for white spot noise. The circuits needed to measure and store the white spot noise add complexity to the system. This additional complexity may increase the system cost prohibitively. In addition, the magnitude of white spot noise is dependent upon the imager ambient temperature and this method fails to account for this variation. Another method periodically measures the dark current of the imager. The imager is covered with a mechanical shutter and the dark image signal is stored. The dark image signal is subtracted from the current imager signal producing a corrected signal. This method works well for imagers used in systems with mechanical shutters, however many imagers applications such as video cameras do not have mechanical shutters. This technique may also increase the system cost prohibitively. Lastly, the image signal may be spatially filtered to compensate for white spot noise. A median filter is typically used. A median filter substitutes the median image signal of the nine pixels of a three by three block having the current pixel in the center for the current pixel image signal. A median filter requires ordering the signal values of the nine pixels. This requires very complex circuits, particularly if the median filtering is performed in the analog domain. Additionally, a median filter is a form of spatial low pass filter and may noticeably reduced the sharpness of the image. Due to these disadvantages, no known method of white spot compensation is entirely satisfactory.

As a consequence of this, there is a need in the art for a better white spot compensation technique for CMOS imagers. Such a better white spot compensation technique would permit the advantages of CMOS imagers to be employed more often.

SUMMARY OF THE INVENTION

This invention corrects of white spot noise in an imager. For each pixel the maximum brightness value of eight surrounding pixels is determined. The brightness value each pixel is compared with this maximum brightness value of the eight surrounding pixels. If the brightness value of the pixel is greater than the brightness value the maximum brightness value of the eight surrounding pixels, then the compensated output is the maximum brightness value of the eight surrounding pixels. If the brightness value of the pixel is less than the maximum brightness value of the eight surrounding pixels, then no compensation is applied. The output is the brightness value of that pixel. Alternatively the brightness value of the pixel may be compared with the maximum brightness value of the eight surrounding pixels plus a threshold value.

A further embodiment stores correction values for a few pixels along with an address indication. If a particular pixel does not have a stored correction value, then the above described compensation is used. If a particular pixel has a stored correction value, then this is subtracted from the brightness value of the particular pixel. If this difference is less than the maximum brightness value of the eight surrounding pixels, then this difference is the compensated output. Otherwise the compensation output is the maximum brightness value of the eight surrounding pixels. The stored correction value is replaced with the difference between the brightness value of the particular pixel and the maximum brightness value of the eight surrounding pixels if this is greater than the stored correction value.

This invention is suitable for embodiment in analog CMOS circuits on the same integrated circuit as a CMOS imager.

BRIEF DESCRIPTION OF THE DRAWINGS

These and other aspects of this invention are illustrated in the drawings, in which.

DETAILED DESCRIPTION OF PREFERRED EMBODIMENTS

Figure 1:
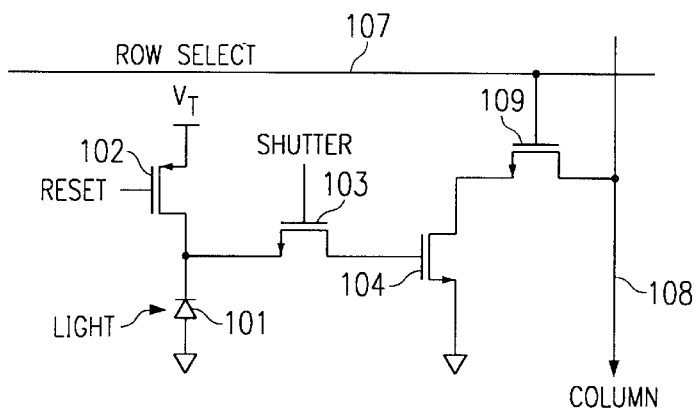
FIG. 1 illustrates the circuits corresponding to a single pixel in the prior art.

FIG. 1 illustrates the circuits corresponding to a single pixel of a CMOS imager in the prior art. The optics required to form an operative system is conventional and is not shown. A CMOS imager operates by detecting the current in a back biased PN junction. The current passing through photo diode 101 has two major components. There is a leakage current which is dependent upon process parameters, primarily the impurity dopant profile, and temperature. There is a photo current which is directly proportional to the amount of light reaching photo diode 101. The process of detecting an image is begun by turning ON MOS transistor 102 via a RESET signal and turning ON MOS transistor 103 via a SHUTTER signal. Note that the RESET signal and the SHUTTER signal are commonly applied to each pixel of a planar array of pixels. This charges the gate of MOS transistor 104 up to the supply voltage $V_T$. Next, MOS transistor 102 is turned OFF. During an exposure interval the SHUTTER signal maintains MOS transistor 103 ON. The charge on the gate of MOS transistor 104 is discharged via MOS transistor 103 and photo diode 101. At the end of the exposure interval, the SHUTTER signal turns MOS transistor 103 OFF. This isolates the gate of MOS transistor 104 retaining the charge. The rate of discharge of the gate of MOS transistor 104 and thus the final charge is dependent upon the current through photo diode 101. Greater light intensity at photo diode 101 causes greater current flow and thus a generally smaller charge at the gate of MOS transistor 104.

The imager data is read out in a fashion similar to that used in CCD's. Following the exposure interval, MOS transistor 105 is turned ON via the ROW SELECT signal. The individual pixels are disposed in a rectangular array of rows and columns. A driver circuit selects a single row to be read via a corresponding ROW SELECT line 107. There is a ROW SELECT line 107 coupled to each pixel in a corresponding row. When turned ON, MOS transistor 105 coupled the source-drain path of MOS transistor 104 to a corresponding COLUMN line 108. The COLUMN line 108 for each column of the array is precharged to the supply voltage $V_T$ and is discharged by the MOS transistors 104 and 105 of the selected row. The rate of discharge of COLUMN line 108 is dependent on the current flowing through the source-drain path of MOS transistor 104, which is determined by the charge stored on its gate. The signal at each COLUMN line 108 is stored as an analog charge in an analog memory. This line of analog memory is read serially creating an analog raster scan signal.

White spot noise comes from differences in the leakage current of the photo diodes. In normal CMOS manufacture there is the possibility that the impurity levels within the photo diodes depart from the nominal values. This departure of impurity levels may cause the leakage current under dark conditions to be noticeably greater than the nominal value. In other CMOS circuits this variation is relatively less significant. Within a dynamic random access memory (DRAM) circuit, an increased leakage current reduces the interval between mandatory memory refresh. Since DRAMS are normally operated with refresh intervals selected significantly less than the maximum permitted intervals, a user would ordinarily detect no difference. In CMOS logic circuits an increased leakage current would make these circuits consume more power but would otherwise not effect circuit operation. In a CMOS imager increased leakage current would be noticeable. It would appear as a brighter spot on a dark background. Recall that increased light results in increased current. Thus increased leakage current would make a pixel appear brighter than it should. Due to the physics involved in creation of electrons from photons in the semiconductor, process variations do not change the slope of the light amplitude to current curve. Note that in fabricating CCD's great care is taken to insure uniform leakage current among the individual pixels.

Point defects of the type that can cause white spot noise generally do not create a corresponding black spot noise. The dark current of the photo diode may be made arbitrarily large by impurity defects causing white spots. However, the leakage current cannot be made less than zero. The photo diode leakage current is very small, on the order of 100 picoAmperes. Thus a photo diode having defect producing a smaller than nominal leakage current is usually not noticeable.

The method for correction of white spot noise of this application involves a non-linear spatial filter. For each pixel in the array of pixels, the maximum signal level of the eight pixels surrounding the current pixel is determined. This surrounding maximum signal level is compared to the signal level of the current pixel. If the current pixel signal level is less than or equal to the maximum signal level of the surrounding pixels, then the current pixel signal is passed unaltered. If the current pixel signal level is greater than the maximum signal level of the surrounding pixels, then a signal corresponding to the maximum signal level of the surrounding pixels is substituted for the current signal level. This technique relies upon the fact that, except for isolated hot spots, most pixels are next to at least one pixel that is greater than or equal to the pixel. The signal corresponding to the maximum signal level of the surrounding pixels may be equal to the determined maximum signal level. Alternatively, the signal corresponding to the maximum signal level of the surrounding pixels may be greater than the determined maximum signal by a up to a threshold amount. In this case the compensated pixel signal is set equal to the current pixel signal until it equals the maximum signal level of the surrounding pixels plus the threshold amount. If the current pixel signal is greater than this sum, then the compensated pixel signal is set equal to the maximum signal level of the surrounding pixels. This allows for the case that the current pixel actually is brighter than its eight surrounding pixels.

This compensation process can be easily performed in the digital domain if the CMOS imager signal is converted to a digital signal and processed digitally. It would be readily apparent to those skilled in the digital image processing art how to program a selected microprocessor or digital signal processor to implement this technique. Note particularly that the process requires only 8 comparisons. It is necessary to compare each pixel signal value with only the prior maximum, since only the maximum value of the 8 surrounding pixels is needed. This contrasts with the computation required for a median filter. In median filtering the signal values of the 9 pixels must be completely ordered to determine the maximum. This complete ordering requires many more comparisons. Thus the present invention requires much less computation than the prior art median filter.

Figure 2:
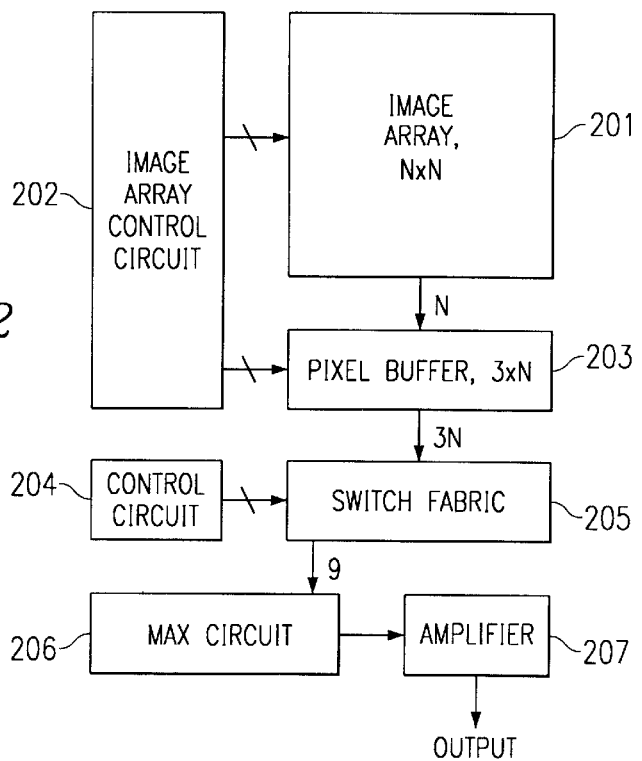
FIG. 2 illustrates in block diagram form the circuits of a CMOS imager having the white spot compensation of this invention.

FIG. 2 illustrates a block diagram of a single integrated circuit including both a CMOS imaging array and circuits to perform the white spot compensation of this invention. The image array of N by N pixels is illustrated at 201. The dimensions of image array 201 is at least several hundred by several hundred pixels. It is known in the art to construct image arrays of 1000 by 1000 pixels. Each pixel in image array 201 includes the photo diode and MOS transistors illustrated in FIG. 1. Note that a square array is illustrates, however it is feasible to construct image arrays of any rectangular dimensions.

Image array control circuit 202 is coupled to image array 201 and controls image capture functions. Image array control circuit 202 controls the RESET and SHUTTER signals as described above for image capture. In a still camera these signals would cycle once each operator initiated exposure. In a video camera these functions would occur repeatedly at a rate corresponding to the frame rate of the camera. Image array control circuit 202 also coordinates the RESET and SHUTTER signals with the operation of a mechanical shutter if present in the imager system. Image array control circuit 202 handles reading out the image signal. Image array control circuit 202 sends an active signal on one and only one of N ROW SELECT lines in sequence. This enables transfer of the charge stored on the gate of MOS transistor 104 to a selected line of memory in pixel buffer 203. Pixel buffer 203 includes three memory lines of N elements. The column lines 108 are coupled to corresponding memory elements within the three lines. A signal from image array control circuit 202 selects which memory line within pixel buffer 203 is used for any particular line transfer. In accordance with the preferred embodiment, the lines of image signals recalled from image array 201 are stored in a rotating fashion in pixel buffer 203. Pixel buffer 203 stores the previous three recalled lines of image signals, with each new recalled line replacing the oldest stored line. The three line memories store the image signals in analog fashion as a charge amount stored on the gate of a MOS transistor.

The three memory lines of image signals enable computation of the compensated image signal for each pixel. Consider the case in which the three memory lines store valid image signals. Switch fabric 205 selects nine memory elements corresponding to a block of 3 by 3 image signals under the control of control circuit 204. These nine selected image signals are supplied to MAX circuit 206, which generates the compensated signal as described above. This compensated image signal is supplied to amplifier 207 which forms the analog output of the circuit. Control circuit 204 the signals switch fabric 205 to select the nine pixels corresponding to the next center pixel of the middle line. These nine signals are supplied to MAX circuit 206, which forms the corresponding compensated image signal. This process continues with control circuit 204 causing switch fabric 205 to select image signals corresponding to succeeding pixels on the center line unit the line is complete. Image array control circuit 202 then selects the ROW SELECT line 107 corresponding to the next row within image array 201. Image array control circuit 202 signals pixel buffer 203 to store the image signals of this next line in the line memory currently storing the oldest line. Once this new line is stored within pixel buffer 203, control circuit 204 controls switch fabric 205 to supply the nine pixel signals corresponding to the first pixel of a new line to MAX circuit 206. Note the rotation of lines within pixel buffer 203 requires switch matrix 205 to supply the nine image signals to MAX circuit 206 in differing orders depending upon which line memory stores the oldest line.

This technique does not require moving image signals once they are stored within pixel buffer 203. This prevents the image signals from being corrupted due to repeated transfers. Switch fabric 205 could be replaced with a simpler selection circuit if data could be moved from one line memory to another without corruption. In this case, switch fabric 205 would only select the pixel within in the line and the first, middle and last lines would be at fixed locations in the view of switch fabric 205.

Figure 3:
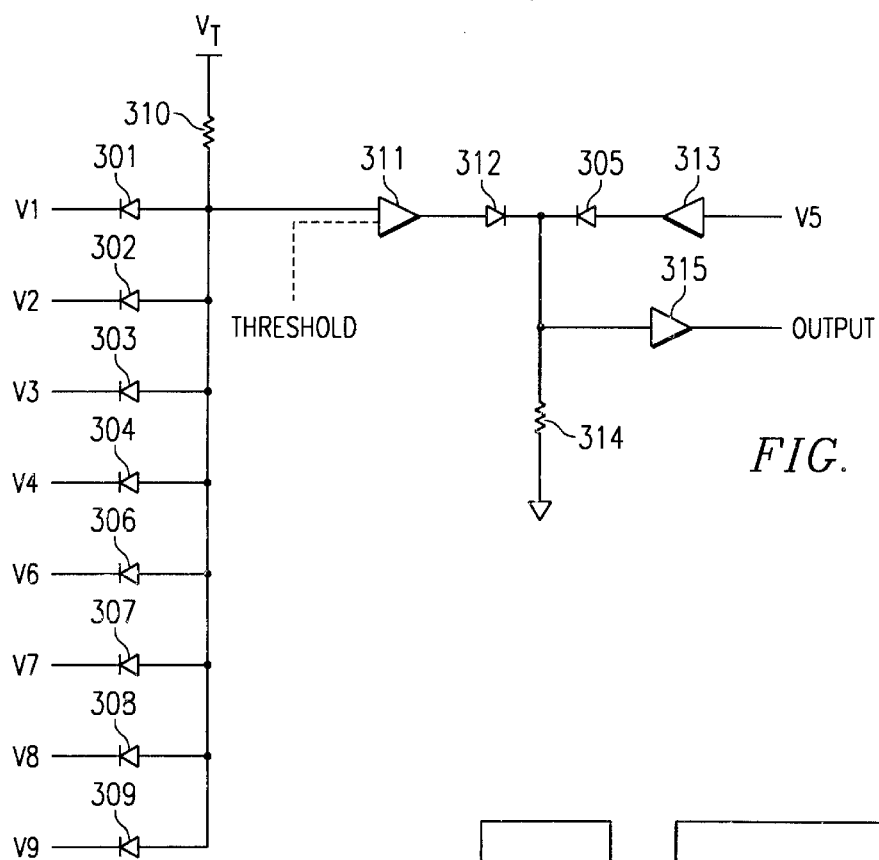
FIG. 3 illustrates one embodiment of the construction of the MAX circuit illustrated in FIG. 2.

The MAX circuit 206 has a simple construction. Determination of the maximum can be easily achieved using analog circuits. A first embodiment is illustrated in FIG. 3. Control circuit 204 controls switch fabric 205 to supply the proper image signals representing the center pixel as V5 and the 8 surrounding pixels as V1 to V4 and V6 to V9. Recall that the image signals are inversely related to the light intensity falling on the pixel. This is because greater light intensity results in more charge taken from the gate of MOS transistor 104 during the exposure interval. The image signal from each of the 8 surrounding pixels is coupled to the cathode of a corresponding one of the 8 diodes 301 to 304 and 306 to 309. The anodes of the diodes 301 to 304 and 306 to 309 are coupled together to one terminal of resistor 310. The other terminal of resistor 310 is connected to the supply voltage $V_T$. The output voltage representing the minimum input voltage representing the maximum light intensity is taken from the common junction between the diodes 301 to 304 and 306 to 309 and resistor 310. The image signal having the minimum voltage drops the voltage at the output terminal up to that voltage less the forward bias drop across the corresponding diode 301 to 304 and 306 to 309. Note that this automatically causes the other diodes to be cut off.

A similar analog maximum circuit determines the output of MAX circuit 206. One input of the second maximum circuit is the maximum signal from buffer 311 and diode 312. The other input is the current pixel image signal via buffer 313 and diode 305. The cathodes of diodes 305 and 312 are coupled together to one terminal of resistor 314. The other terminal of resistor 314 is grounded. Buffer 315 produces the output of MAX circuit 206. If the current pixel image signal is greater than the maximum of the 8 surrounding pixels, corresponding to a smaller measured brightness, then the maximum signal is output from the second maximum circuit. If current pixel image signal is greater than the maximum of the 8 surrounding pixels, corresponding to a greater measured brightness, then the current pixel image signal is output from the second maximum circuit. To implement the alternative embodiment comparing the current image signal to the sum of the maximum threshold and a threshold, a voltage corresponding to the threshold is added in inverter 311. This is shown in dashed lines in FIG. 3.

Figure 4:
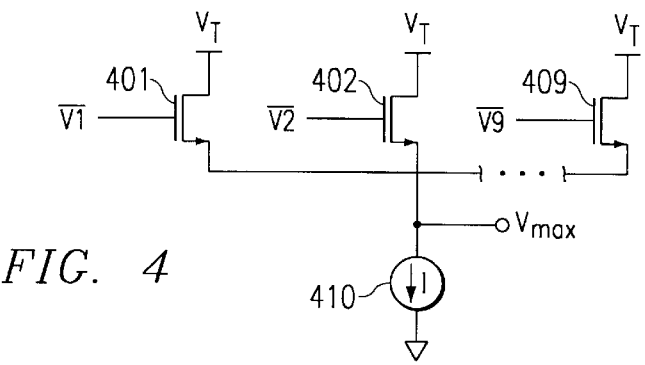
FIG. 4 illustrates an alternative embodiment of the MAX circuit illustrated in FIG. 2.

FIG. 4 illustrates an alternative circuit for the maximum determination. This circuit employs inverse image signals which are directly proportional to the received light amplitude. The inverse image signals $\overline{V1}$ to $\overline{V4}$ and $\overline{V6}$ to $\overline{V9}$ selected by switch fabric 205 are coupled to the gates of MOS transistors 401 to 404 and 406 to 409, respectively. The source-drain path of MOS transistors 401 to 404 and 406 to 409 are connected between the supply voltage $V_T$ and conventional current source 410. The output is the voltage across current source 410. In operation, the highest image signal $\overline{V1}$ to $\overline{V4}$ and $\overline{V6}$ to $\overline{V9}$ turns ON its corresponding MOS transistor and supplies a voltage to the common node. This causes the other MOS transistors to be cut off and they do not supply current to current source 410. The magnitude of the maximum image signal determines the voltage across the corresponding MOS transistor and hence the output voltage $V_{max}$. A similar circuit could be used in place of the second maximum circuit illustrated in FIG. 3.

One problem with the technique described above is that it eliminates isolated bright points in the image. In most applications and particularly with video applications, this elimination of isolated bright points would not be objectionable. An alternative technique will be described below. This alternative technique stores information corresponding to a few pixels to enable an estimation of the true dark current of the pixels with the worst leakage. It is believed that storing dark current correction data on as few as 30 pixels for arrays as large as 1000 pixels by 1000 pixels could substantially increase the yield of operable imagers.

Figure 5:
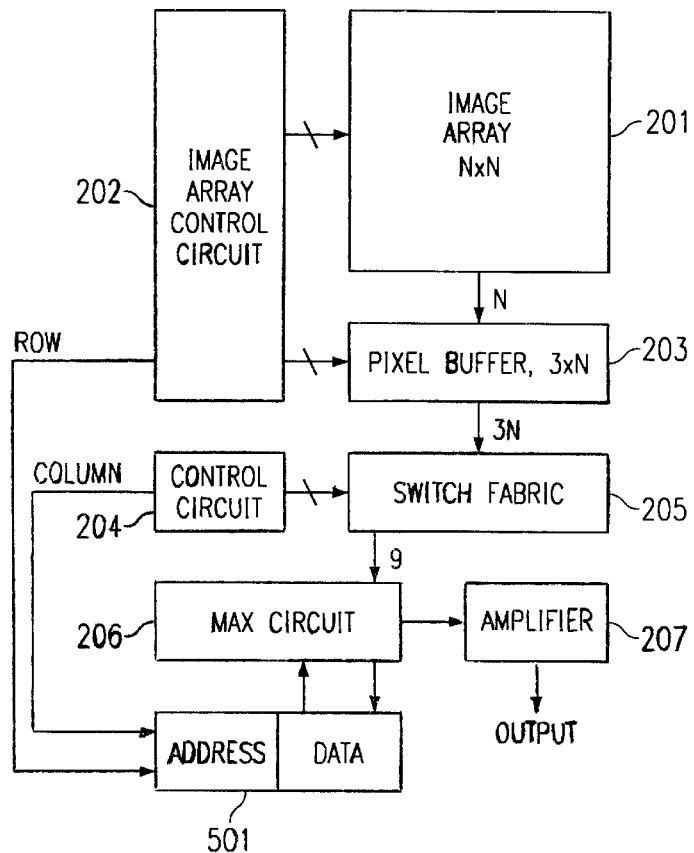
FIG. 5 illustrates in block diagram form the circuits of a CMOS imager having an alternative white spot compensation of this invention.

FIG. 5 illustrates the circuits necessary to practice this dark spot estimator. Image array control circuit 202 supplies a digital signal to memory 501 indicating the currently accessed row. In a like fashion, control circuit 204 supplies a digital signal to memory 501 indicating the currently accessed column. Memory 501 compares these received row and column addresses to the rows and columns of pixels having stored corrections. This comparison is of the same type as employed by cache memories. If memory 501 does not store a correction for the current pixel, then MAX circuit 206 operates as previously described. If memory 501 stores a correction for the current pixel, then memory 501 supplies this correction to MAX circuit 206. MAX circuit 206 forms the difference of the current image signal (P) and the recalled correction signal (C). MAX circuit 206 then determines the maximum of the difference P-C and the maximum of the surrounding pixels (M). If P-C is less than M, then the corrected signal P-C is the output for that pixel. If P-C is greater than M, then the maximum of the surrounding pixels M is the output for that pixel. If this case a new difference between the current image signal and the maximum of the surrounding pixels (P-M) is formed. If this new difference is greater than the stored correction C, then the new difference is stored for that pixel. If the new difference is less than the stored correction, then the stored correction is retained.

This process will generally cause the stored correction C to approach the dark current for the corresponding pixel. This is based upon the assumption that each pixel receives the same distribution of light intensities as all other pixels. It is considered best to store the correction values in an analog memory like those employed in pixel buffer 203. Such an analog memory would gradually decay toward zero due to inherent leakage currents. This would prevent the permanent storage of an anomalous high correction value. With such decay the correction value would eventually decrease to the proper dark current estimate. The pixels selected for storage of correction values are preferably those exhibiting the largest leakage current and thus the most noticeable white spot noise. It is believed preferable to limit storage of correction values to those pixels whose calculated correction values are above a certain threshold. These pixels may be selected during manufacturing test. In this case the addresses stored in memory 501 may be fixed following manufacturing test. This pixels may also be selected upon each use of the imager. The memory 501 may store the first pixels having calculated correction values above the certain threshold until the number of memory places is full. Alternatively, some sort of replacement technique could be used. This could be as replacement of the least correction value when a calculated correction value exceeds it.

The circuits necessary to practice this invention are believed to be small relative to the size of the image array. The need for two additional line memories is believed to the major contribution to needed additional circuits. Even for small image arrays these two additional line memories represent less than an additional 1% of circuits. Thus embodiment of this invention into CMOS imagers is technically feasible. It is believed that use of these techniques could dramatically increase the yield of operable imagers with this small addition in circuits.

This foregoing description of the invention has generally described analog signal processing. Those skilled in the art would realize that this invention can be practices using digital signal processing. This requires digitization of the individual pixel image signals and storage in a digital memory. The computation of the maximum of the 8 surrounding pixels could be achieved by proper addressing of this memory and serial comparisons. The alternative selections described above could be achieved via IF-THEN program steps. It would be readily apparent to those skilled in the digital image processing art how to program a selected microprocessor or digital signal processor to implement the techniques of this invention described above. The determination of whether to implement this invention in analog or digital signal processing could depend upon the products vended by the manufacturer. A manufacturer vending stand alone imagers would generally prefer to implement this invention in analog signal processing circuits disposed on the same integrated circuit as the imager. A manufacturer vending a system including an imager and digital processing logic may prefer to implement this invention in the digital signal processing logic.

What is claimed is:

1. A method of correction of white spot noise in an imager comprising the steps of:

disposing a plurality of pixels in an array of at least 1000 rows and 1000 columns;

storing a plurality of correction values for particular pixels, said plurality of correction values being no more than 30;

for each of said plurality of pixels determining a maximum brightness value of eight surrounding pixels;

detecting if any particular pixel has stored correction value;

if any particular pixel does not have a stored correction value then determining if a brightness value for each pixel is greater than a brightness value corresponding to said determined maximum brightness value of said eight surrounding pixels;

if said brightness value of any particular pixel is greater than said brightness value corresponding to said determined maximum brightness value of said eight surrounding pixels, then outputting said brightness value corresponding to said determined maximum brightness value of said eight surrounding pixels for said particular pixel; and if said brightness value of any particular pixel is less than said brightness value corresponding to said determined maximum brightness value of said eight surrounding pixels, then outputting said brightness value of said particular pixel; and if any particular pixel has a stored correction value then subtracting said stored correction value from said brightness value of said particular pixel thereby forming a first difference value determining if said first difference value is greater than said determined maximum brightness value of said eight surrounding pixels, if said first difference value is not greater than said determined maximum brightness value of said eight surrounding pixels, outputting said first difference value, if said first difference value is greater than said determined maximum brightness value of said eight surrounding pixels, outputting said determined maximum brightness value of said eight surrounding pixels, subtracting said determined maximum brightness value of said eight surrounding pixels from said brightness value of said particular pixel thereby forming a second difference value, determining if said second difference value is greater than said stored correction value, and if said second difference value is greater than said stored correction value, storing said second difference value for said particular pixel.

2. The method of claim 1, wherein:

said step of storing a plurality of correction values stores corresponding pairs of an address and a correction value for a pixel having the corresponding address; and said step of detecting if a particular pixel has a stored correction value includes detecting if the address of the particular pixel matches the address of one of the corresponding pairs.

3. The method of claim 2, wherein:

said step of storing a plurality of correction values selects the particular pixels upon manufacture test and fixes the address of each corresponding pair following manufacture test.

4. The method of claim 1, wherein:

said step of storing a plurality of correction values stores the correction values in an analog memory having a decay toward zero correction value due to inherent leakage currents.

5. The method of claim 1, wherein:

said step of storing a plurality of correction values stores correction values for a predetermined number of pixels having a highest leakage among the plurality of pixels in the imager.

6. The method of claim 1, wherein:

said step of storing a plurality of correction values stores correction values only for pixels having a correction value calculated from the second difference value greater than a predetermined threshold.

7. The method of claim 1, wherein:

said step of storing a plurality of correction values selects the particular pixels during use of the imager.

8. The method of claim 7, wherein:

said step of storing a plurality of correction values selects the particular pixels as the first pixels having correction values calculated from corresponding second difference values greater than a predetermined threshold until a predetermined number of correction values are selected.

9. The method of claim 7, wherein:

said step of storing a plurality of correction values selects the particular pixels by replacing a pixel having a smallest correction value with a current pixel when a correction value calculated from the second difference value of the current pixel exceeds the correction value of the pixel having the smallest correction value.

10. An imager circuit comprising:

a matrix of light sensitive elements disposed in a first predetermined number of rows and a second predetermined number of columns, each light sensitive element generating an image signal corresponding to brightness of received light;

a first predetermined number of row select lines, each row select line disposed adjacent to light sensitive elements in a corresponding row;

a second predetermined number of column lines, each column line disposed adjacent to light sensitive elements in a corresponding column;

a plurality of MOS transistors, one corresponding to each light sensitive element, each MOS transistor having a source-drain path connect between said corresponding light sensitive element and said column line corresponding to said light sensitive element and having a gate connected to said row select line corresponding to said light sensitive element;

a pixel buffer connected to said column lines and having three rows of said second plurality of analog memory elements, each analog memory element in each of said three rows selectively connectable to a corresponding column line for storing image signals;

an image array control connected to said row select lines and said pixel buffer, said image array control operable to sequentially signal one of said row select lines thereby causing each MOS transistor of said corresponding row to connect said corresponding light sensitive element to said corresponding column line and to selectively connect one of said three rows of analog memory to said column lines to store therein image signals from said light sensitive elements of said selected row;

a switch fabric connected to said pixel buffer and having nine output lines, said switch fabric sequentially connecting said nine output lines to analog memory elements of said pixel buffer corresponding to a center pixel and eight pixels surrounding said central pixel;

a maximum circuit connected to eight output lines of said switch fabric corresponding to said eight pixels surrounding said central pixel, said maximum circuit generating a maximum image signal equal to said image signal of said eight pixels surrounding said central pixel corresponding to maximum brightness;

a minimum circuit connected to one output line of said switch fabric corresponding to said central pixel and to said maximum circuit, said minimum circuit generating at an output a compensated image signal equal to the one of said image signal of said central pixel and said maximum image signal corresponding to minimum brightness;

an analog memory having a number of analog storage locations much less than the number of light sensitive elements in said matrix, each analog storage location including an address storage storing an indication of a location of a particular one of said light sensitive elements within said matrix, a match circuit connected to said address storage, said image array control circuit and said switch fabric for determining if said central pixel has a location matching said stored in said address storage and an analog memory element storing a correction signal;

a first subtraction circuit connected to said switch fabric and said analog memory for subtracting a stored correction value from said image signal of said central pixel thereby forming a first difference value if said match circuit detects a match between said location of said central pixel and one of said address storages;

a second minimum circuit connected to said maximum circuit and said first subtraction circuit, said second minimum circuit generating at an output said compensated image signal equal to the one of said first difference signal and said maximum image signal corresponding to minimum brightness;

a second subtraction circuit connected to said switch fabric and said maximum circuit for subtracting said maximum signal from said image signal of said central pixel thereby forming a second difference signal;

a second maximum circuit connected to said analog memory and said second subtraction circuit, said second maximum circuit generating at an output for storage in said analog memory element having a corresponding address storage matching said location of said central pixel a correction signal equal to the one of said second difference signal and said maximum image signal corresponding to maximum brightness.

11. The imager circuit of claim 10, wherein:

said matrix of light sensitive elements includes at least 100 rows and 1000 columns; and said analog memory has no more than 30 analog storage locations.

12. The imager circuit of claim 10, wherein:

each analog memory element of said analog memory includes an inherent leakage current causing a decay toward zero correction value.

13. The imager circuit of claim 10, wherein:

said address storage of each analog storage location is fixed following manufacture test.

* * * * *